United States Patent
Ndamka et al.

(10) Patent No.: US 10,871,078 B2
(45) Date of Patent: Dec. 22, 2020

(54) LOW POROSITY ABRADABLE COATING

(71) Applicants: Rolls-Royce Corporation, Indianapolis, IN (US); Rolls-Royce plc, London (GB)

(72) Inventors: Ngunjoh Lawrence Ndamka, Derby (GB); Li Li, Carmel, IN (US); Stephanie Gong, Indianapolis, IN (US); Sunny Chang, Carmel, IN (US); Ann Bolcavage, Indianapolis, IN (US); Taylor K. Blair, Indianapolis, IN (US)

(73) Assignees: Rolls-Royce Corporation, Indianapolis, IN (US); Rolls-Royce plc, London (GB)

( * ) Notice: Subject to any disclaimer, the term of this patent is extended or adjusted under 35 U.S.C. 154(b) by 182 days.

(21) Appl. No.: 16/135,036

(22) Filed: Sep. 19, 2018

(65) Prior Publication Data

US 2019/0093497 A1    Mar. 28, 2019

Related U.S. Application Data

(60) Provisional application No. 62/563,984, filed on Sep. 27, 2017.

(51) Int. Cl.
*F01D 11/12* (2006.01)

(52) U.S. Cl.
CPC ........ *F01D 11/122* (2013.01); *F05D 2230/31* (2013.01); *F05D 2230/90* (2013.01);
(Continued)

(58) Field of Classification Search
CPC .... F01D 11/122; F01D 11/12; F05D 2230/31; F05D 2230/90; F05D 2230/15;
(Continued)

(56) References Cited

U.S. PATENT DOCUMENTS

| 3,499,837 A | 3/1970 | Jaunarajs |
| 5,911,882 A | 6/1999 | Benjamin et al. |

(Continued)

FOREIGN PATENT DOCUMENTS

EP    2192098 A2    6/2010

OTHER PUBLICATIONS

Chen et al., A Self-Healing Environmental Barrier Coating: TiSi2-doped Y2Si2O7/ Barium Strontium Aluminosilicate Coating, Surface and Coatings Technology, vol. 307. Sep. 12, 2016, 5 pp.
(Continued)

*Primary Examiner* — William K Cheung
(74) *Attorney, Agent, or Firm* — Shumaker & Sieffert, P.A.

(57) ABSTRACT

An article for use in a high-temperature environment that includes a substrate including a superalloy material, a ceramic, or a ceramic matrix composite, and an abradable coating on the substrate, the abradable coating including a rare earth silicate and a dislocator phase, the dislocator phase forms one or more distinct phase regions in the abradable coating and comprises at least one of hafnium diboride ($HfB_2$), zirconium diboride ($ZrB_2$), tantalum nitride (TaN or $Ta_2N$), tantalum carbide ($Ta_2C$), titanium diboride ($TiB_2$), zirconium carbide (ZrC), hafnium carbide (HfC), tantalum diboride ($TaB_2$), hafnium nitride (HfN), or niobium carbide (NbC).

20 Claims, 2 Drawing Sheets

(52) U.S. Cl.
CPC ...... *F05D 2240/55* (2013.01); *F05D 2300/15* (2013.01); *F05D 2300/175* (2013.01); *F05D 2300/2112* (2013.01); *F05D 2300/226* (2013.01); *F05D 2300/228* (2013.01); *F05D 2300/30* (2013.01); *F05D 2300/611* (2013.01)

(58) Field of Classification Search
CPC ....... F05D 2230/175; F05D 2230/2112; F05D 2230/226; F05D 2230/228; F05D 2230/30; F05D 2230/611; F05D 2240/55
USPC ........................................................ 428/457
See application file for complete search history.

(56) References Cited

U.S. PATENT DOCUMENTS

| | | |
|---|---|---|
| 6,444,335 B1 | 9/2002 | Wang et al. |
| 9,365,725 B2 | 6/2016 | Sarrafi-Nour et al. |
| 9,890,089 B2 | 2/2018 | Kirby et al. |
| 2006/0280955 A1 | 12/2006 | Spitsberg et al. |
| 2010/0080984 A1 | 4/2010 | Lee |
| 2010/0154422 A1 | 6/2010 | Kirby et al. |
| 2011/0027517 A1 | 2/2011 | Kirby et al. |
| 2012/0018384 A1 | 1/2012 | Sawyer |
| 2013/0136915 A1 | 5/2013 | Naik |
| 2013/0189531 A1 | 7/2013 | Lee |
| 2014/0261080 A1 | 9/2014 | Lee |
| 2015/0159507 A1 | 6/2015 | Sivaramakrishnan |
| 2015/0267058 A1 | 9/2015 | Lee |
| 2016/0214907 A1 | 7/2016 | Shim et al. |
| 2016/0362557 A1 | 12/2016 | Lee |
| 2017/0122116 A1 | 5/2017 | Lee |
| 2018/0305821 A1* | 10/2018 | Wan ........................ C23C 14/08 |
| 2019/0063250 A1* | 2/2019 | Shi ............................ F01D 5/20 |

OTHER PUBLICATIONS

Zhu et al., Development of Advanced Environmental Barrier Coatings for SiC/SiC Ceramic Matrix Composites: Path Toward 2700 degrees F Temperature Capability and Beyond, NASA, 41st Annual Conference on Composites, Materials, and Structures, Jan. 23-27, 2010, 24 pp.

Nguyen et al., "Iron Coated Sponge in Arsenic Removal," Fluid/Particle Separation Journal, vol. 16, No. 2, 2004 (Applicant points out, in accordance with MPEP 609.04(a), that the year of publication, 2004, is sufficiently earlier than the effective U.S. filing date, 2017, so that the particular month of publication is not in issue.) pp. 175-183.

Nguyen et al., "Iron-Coated Sponge as Effective Media to Remove Arsenic from Drinking Water," Water Quality Research Journal of Canada, vol. 41, No. 2, 2006 (Applicant points out, in accordance with MPEP 609.04(a), that the year of publication, 2006, is sufficiently earlier than the effective U.S. filing date, 2017, so that the particular month of publication is not in issue.) pp. 164-170.

Kumar et al., "Removal of Arsenic by Sorption to Iron-Coated Fibers," Water Research Foundation, 2009 (Applicant points out, in accordance with MPEP 609.04(a), that the year of publication, 2009, is sufficiently earlier than the effective U.S. filing date, 2017, so that the particular month of publication is not in issue.) 67 pp.

U.S. Appl. No. 62/563,984, by Ngunjoh Lawrence Ndamka, filed Sep. 27, 2017.

* cited by examiner

LOW POROSITY ABRADABLE COATING

This application claims the benefit of U.S. Provisional Application No. 62/563,984 filed Sep. 27, 2017, which is incorporated herein by reference in its entirety.

TECHNICAL FIELD

The disclosure relates to abradable coatings for use in high-temperature mechanical systems.

BACKGROUND

The components of high-temperature mechanical systems such as, for example, gas-turbine engines, operate in severe environments. For example, the high-pressure turbine blades, vanes, blade tracks, and blade shrouds exposed to hot gases in commercial aeronautical engines may experience surface temperatures of about 1000° C. or more, with the temperature of the hot gases capable of reaching even high temperatures.

Components of high-temperature mechanical systems may include a Ni- or Co-based superalloy substrate or a silicon-based ceramic or ceramic matrix composite (CMC) substrate configured to operate in high-temperature environments. One or more coating layers may be applied to such substrates to help protect the underlying substrate from the high-temperatures of the external environment or protect the underlying substrate from deleterious compounds present in such environments.

In some examples, the power and efficiency of gas turbine engines may be improved by reducing the gap between a gas turbine blade and a surrounding blade track or blade shroud. The clearance between the rotating blade and the track or shroud may be reduced by coating the track or shroud with an abradable coating. Gas turbine engines may thus include abradable coatings as a sealing surface between rotating parts, for example, between the blade tips and the corresponding track or shroud. As the turbine blade rotates, the tip of the turbine blade contacts the abradable coating and wears away a portion of the coating to form a groove in the abradable coating corresponding to the path of the turbine blade. The intimate fit between the blade tip and abradable coating provides a seal that can reduce the clearance gap between the rotating component and an inner wall of the track or shroud, which can reduce leakage around a tip of the rotating part to enhance the power and efficiency of the gas turbine engine.

SUMMARY

In general, the present disclosure is directed to a relatively dense abradable coating that may be applied on a Ni- or Co-based superalloy substrate or a silicon-based ceramic or ceramic matrix composite (CMC) substrate for use as components in high-temperature mechanical systems. The dense abradable coating described herein may exhibit a lower overall porosity and may be less susceptible to degradation via the ingress of deleterious chemical species. The dense abradable coating may include a dislocator phase, which facilitates the use of a higher density/lower porosity abradable coating.

In some examples, the disclosure describes an article for use in a high-temperature environment that includes a substrate including a superalloy material, a ceramic, or a ceramic matrix composite, and an abradable coating on the substrate, the abradable coating includes a rare earth silicate and a dislocator phase where the dislocator phase forms one or more distinct phase regions in the abradable coating and includes at least one of hafnium diboride ($HfB_2$), zirconium diboride ($ZrB_2$), tantalum nitride (TaN or $Ta_2N$), tantalum carbide ($Ta_2C$), titanium diboride ($TiB_2$), zirconium carbide (ZrC), hafnium carbide (HfC), tantalum diboride ($TaB_2$), hafnium nitride (HfN), or niobium carbide (NbC).

In some examples, the disclosure describes a method including depositing an abradable coating on a substrate, where the substrate includes a superalloy material, a ceramic, or a ceramic matrix composite, where the abradable coating includes a rare earth silicate and a dislocator phase, where the dislocator phase forms one or more distinct phase regions in the abradable coating and includes at least one of hafnium diboride ($HfB_2$), zirconium diboride ($ZrB_2$), tantalum nitride (TaN or $Ta_2N$), tantalum carbide ($Ta_2C$), titanium diboride ($TiB_2$), zirconium carbide (ZrC), hafnium carbide (HfC), tantalum diboride ($TaB_2$), hafnium nitride (HfN), or niobium carbide (NbC).

The details of one or more examples of the invention are set forth in the accompanying drawings and the description below. Other features, objects, and advantages of the invention will be apparent from the description and drawings, and from the claims.

DETAILED DESCRIPTION

The present disclosure is directed to an abradable coating that may be applied over a substrate for use in a high-temperature mechanical system, such as a gas turbine blade track or blade shroud. The abradable coating may include a rare earth silicate and a dislocator phase. In some examples, the abradable coating may be a relatively dense layer having a relatively low porosity compared to some other abradable coatings. In some examples, the abradable coatings described herein may be deposited on one or more intermediate layers including, but not limited to, an environmental barrier coating (EBC), a thermal barrier coating (TBC), or other single or multi-layer coating systems.

During use within a gas turbine engine, the abradable coating may provide a seal between the blade track or blade shroud and a gas turbine blade. The gas turbine blade may intentionally contact and abrade at least a portion of the abradable coating to form a groove in the abradable coating corresponding to the path of the turbine blade. This allows for intimate contact between the turbine blade tip and abradable coating while also allowing the turbine blade to rotate freely. In addition, the abradable coating may be usable in high-temperature systems where rubber or other polymeric seals would degrade.

The dislocator phases described herein may reduce mechanical strength of the abradable coating, may reduce a coefficient of friction of the abradable coating, or both, which may result in preferential breaking of the abradable coating within the dislocator phases during contact between a blade tip and the abradable coating. As such, the dislocator phases may perform similarly to porosity in some other abradable coatings. However, the dislocator phase may provide a physical barrier against infiltration of external environmental species, such as calcium-magnesium-alumino-silicate (CMAS) into the abradable coating. In some examples, the dislocator phase may include at least one of hafnium diboride ($HfB_2$), zirconium diboride ($ZrB_2$), tantalum carbide ($Ta_2C$), titanium diboride ($TiB_2$), Zirconium carbide (ZrC), hafnium carbide (HfC), tantalum diboride ($TaB_2$), hafnium nitride (HfN), tantalum nitride (TaN, $Ta_2N$), niobium carbide (NbC), or combinations thereof. In some examples, the dislocator phase may include at least one of hafnium diboride ($HfB_2$), zirconium diboride ($ZrB_2$), tantalum nitride (TaN, $Ta_2N$), or tantalum carbide ($Ta_2C$).

Figure 1:
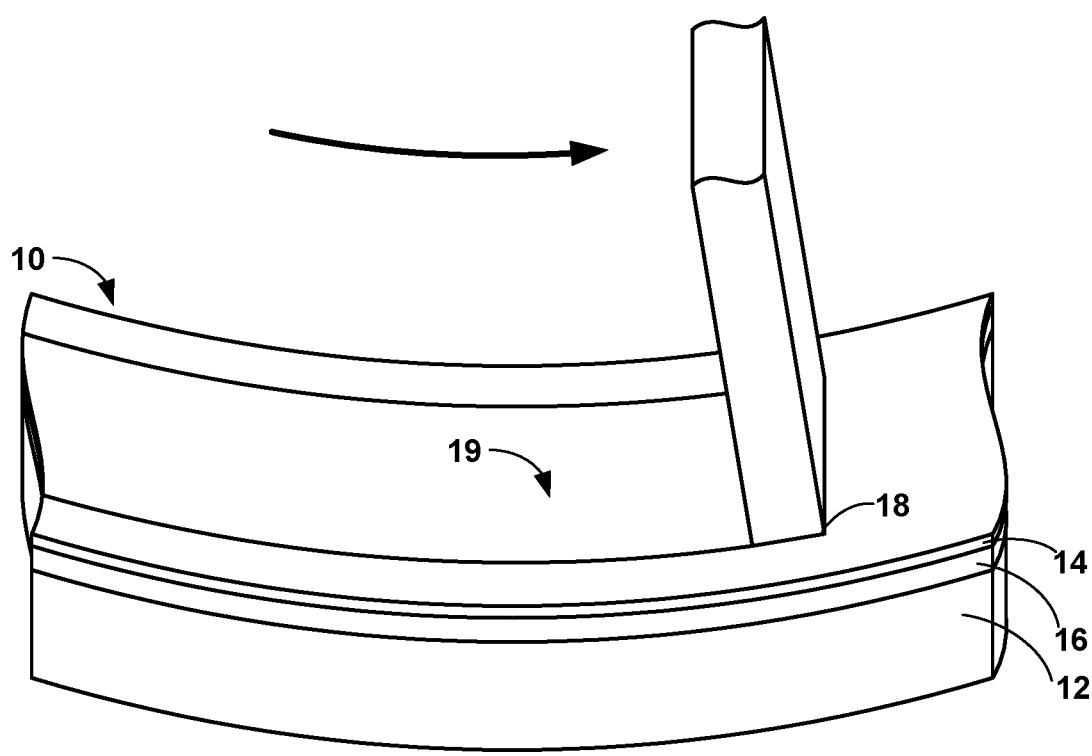
FIG. 1 is a perspective diagram illustrating an example article that includes an abradable coating deposited on a substrate.

FIG. 1 illustrates a perspective diagram of an example article 10 that may be used in a high-temperature mechanical system. Article 10 includes a substrate 12, one or more optional intermediate layers 16 deposited on substrate 12, and an abradable coating 14 deposited on optional intermediate layers 16 and substrate 12. As used herein, a layer or coating being "deposited on" or being "on" another component (e.g., layer or substrate) means that the layer or coating that is formed on top of the other component, and encompasses both the layer or coating formed immediately adjacent to and in direct contact with the component, or the layer or coating formed over the component with one or more additional layers present between the component and the respective layer or coating. In contrast, a layer or coating being "formed directly on" and "directly on" a component is used to denote that the layer or coating that is formed immediately adjacent to the component, such that there are no intermediate layers or coatings.

Article 10 may be a component of a high-temperature mechanical system, such as, for example, a gas turbine engine or the like. In some examples, article 10 may include a gas turbine blade track or gas turbine blade shroud. However, while the following description will be directed primarily to a gas turbine blade track or shroud, it will be understood that the disclosure is not limited to such examples. Rather, abradable coating 14 may be deposited over any article which requires or may benefit from an abradable coating. For example, abradable coating 14 may be deposited on a cylinder of an internal combustion engine, an industrial pump, a housing or internal seal ring of an air compressor, or an electric power turbine.

Substrate 12 of article 10 may include a metal or alloy substrate, for example, a Ni- or Co-based superalloy substrate, or a ceramic-based substrate, for example, a substrate including a ceramic or ceramic matrix composite (CMC). Suitable ceramic materials, may include, for example, a silicon-containing ceramic, such as silica ($SiO_2$), silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples in which substrate 12 includes a ceramic, the ceramic may be substantially homogeneous.

In examples in which substrate 12 includes a CMC, substrate 12 may include a matrix material and a reinforcement material. The matrix material may include, for example, silicon or a ceramic material, such as silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or other ceramics described herein. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave or web. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), another ceramic material described herein, or the like.

The filler composition, shape, size, and the like may be selected to provide the desired properties to the CMC. For example, the filler material may be chosen to increase the toughness of a brittle ceramic matrix. The filler may also be chosen to modify a thermal conductivity, electrical conductivity, thermal expansion coefficient, hardness, or the like of the CMC.

In some examples, the filler composition may be the same as the ceramic matrix material. For example, a silicon carbide matrix may surround silicon carbide whiskers. In other examples, the filler material may include a different composition than the ceramic matrix, such as aluminum silicate fibers in an alumina matrix, or the like. In some examples, substrate 12 includes silicon carbide continuous fibers embedded in a silicon carbide matrix (e.g., a SiC—SiC CMC).

Article 10 also includes abradable coating 14 deposited on substrate 12 and intermediate layers 16 when present. Abradable coating 14 may exhibit a disposition to break into relatively small pieces when exposed to a sufficient physical force without causing damage to underlying intermediate layers 16 or substrate 12. Abradability may be influenced by the material characteristics of abradable coating 14, such as fracture toughness and fracture mechanism (e.g., brittle fracture). Some abradable coatings may be relatively porous (e.g., a porosity of between about 25 percent by volume (vol. %) and about 50 vol. %, where porosity is measured as a percentage of pore volume divided by total volume of a respective layer and may be measured using optical microscopy, liquid porosimetry, or the like). In such examples, the porosity of the abradable coating may help reduce the shear strength within the layer resulting from the rotating component (e.g., blade tip 18) contacting the abradable coating. In turn, portions of the abradable coating can fracture and abrade into relatively small pieces thereby permitting a close seal between the abradable coating and the rotating component (e.g., blade tip 18) without damaging the remaining portions of the abradable coating, underlying intermediate layers 16, or substrate 12.

In some examples, while the relatively high porosity of an abradable coating may improve the abrasion characteristics of the coating, the relatively high porosity of the abradable coating may cause the component to be more susceptible to environmental attacks associated with the operation of article 10 in the high-temperature environments. For example, a highly porous abradable coating may permit a greater ingress of deleterious compounds such as water vapor or oxygen into and through the porous abradable coating. Such compounds may react with compounds present in underlying intermediate layers 16, substrate 12, or both to degrade or otherwise diminish the useful life of article 10.

Additionally, or alternatively, a highly porous abradable coating may lead to increased degradation attributed to CMAS deposits. CMAS deposits may generally include siliceous minerals (e.g., airborne dust, sand, volcanic dust and ashes, fly ash runway debris, concrete dust, fuel residue, and the like) which may be drawn into and through the air path of gas turbine engines. While CMAS is used as a term to generally describe such deposits, it is understood that the CMAS deposits and the associated reactions may involve a large number of different compounds and reactive species; however, calcium oxide (CaO), magnesia (MgO), alumina ($Al_2O_3$) and silica ($SiO_2$) are recognized as being the predominant compounds associated with the CMAS deposits.

While operating article 10 in high-temperature environments, the ingestion of such CMAS deposits may lead to increased damage. For example, some of the CMAS deposits may exhibit a melting temperature in the vicinity of about 1200° C. to about 1250° C. (e.g., about 2200° F. to about 2300° F.). Due to the high-temperature environments in which the described components are operated, the CMAS deposits may melt and accumulate on the outer surfaces of the abradable coating. Through continued operation, the molten CMAS deposits may migrate into the outer abradable coating through pores and cracks within the abradable coating. When article 10 cools below the melting temperature of the CMAS deposits, the CMAS deposit will solidify and exert a strain on the abradable coating. Such thermal cycling of the abradable coating may lead to the development of undesired fractures and/or spallation of the abradable coating over time.

Additionally, in some examples, the ingress of CMAS deposits through the abradable coating may lead to deleterious reactions and damage within the abradable coating, underlying intermediate layers 16, substrate 12, or a combination thereof damaging the coatings layers in the process. Such undesired chemical reactions with the CMAS deposits involve a series of complex reactions which may be difficult to understand and/or predict.

In some examples, the deleterious environmental reactions and effects associated with CMAS deposits, or other harmful compounds, may be reduced by reducing the porosity of abradable coating 14. Reducing the porosity of abradable coating 14 may reduce the available pathways in which the deleterious compounds may traverse into or through abradable coating 14. By decreasing the porosity of abradable coating 14, the thermal shock resistance of the layer (due to infiltrated CMAS deposits) and general robustness against chemical attack may be improved leading to the layer and article 10 having a longer useful lifespan. However, reducing the overall porosity of abradable coating 14 generally will correspond with also reducing the abradability of abradable coating 14, for example, by increasing the internal mechanical strength within the abradable coating 14. This may result in abrasion of abradable coating 14 requiring more force from the rotating component (e.g., blade tip 18) to abrade or increasing the strain within abradable coating 14 or underlying component layers. Additionally, reducing the abrasion characteristics of abradable coating 14 may also reduce the overall efficiency of the engine by requiring more energy to cut and maintain a track 19 within such a coating, as well as increase the mechanical wear on the components (e.g., article 10 or blade tip 18).

In accordance with the techniques described herein, the porosity of abradable coating 14 may be reduced without significantly reducing the abradability of abradable coating 14 by including a dislocator phase with a rare earth silicate that forms the coating. As used herein, a "dislocator phase" refers to a material that forms one or more distinct phase regions in abradable coating 14 and reduces the internal mechanical strength of abradable coating 14, thereby reducing the shear stress within abradable coating 14 during the abrasion process compared to an abradable coating that includes only a rare earth silicate and not the dislocator phase.

In some examples, the dislocator phase may include materials that remain substantially chemically inert (e.g., materials chemically inert to reactions with the rare earth silicates of abradable coating 14, compounds of intermediate layers 16, CMAS, or the like) and physically stable (e.g., do not melt or soften) at the relatively high temperatures (e.g., temperatures of 1400° C. or more) in which article 10 operates.

In some examples, the dislocator phase may be selected to exhibit a lower coefficient of friction compared to the rare earth silicate(s) selected for inclusion in abradable coating 14. The properties of the dislocator phase may in turn reduce the bonding strength between the dislocator phase and rare earth silicate within abradable coating 14, thereby allowing the layer to more easily abrade upon contact with blade tip 18 of a gas turbine engine.

Abradable coating 14 may include at least one rare earth silicate. The rare earth silicate may include a silicate of at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium) La (lanthanum), Y (yttrium), and Sc (scandium). The rare earth silicate may include a rare earth monosilicate, which has the chemical formula $RE_2O_3$—$SiO_2$ or, equivalently, $RE_2SiO_5$, where RE is a rare earth element; may include a rare earth disilicate, which has the formula $RE_2O_3$-$2SiO_2$ or, equivalently, $RE_2Si_2O_7$; or may include a mixture of both rare earth monosilicate(s) and rare earth disilicate(s). The rare earth silicate may be formed by a chemical reaction between silica and rare earth oxide molecules in the relevant stoichiometric amount. In some examples, the rare earth silicate within abradable coating 14 may include or consist essentially of ytterbium silicate. Ytterbium silicate has been found to provide relatively strong resistance to environmental or CMAS degradation while also providing a material with a relatively low coefficient of thermal expansion and conductivity (e.g., improved thermal insulative properties) to the resultant abradable coating.

The dislocator phase may be added to abradable coating 14 in any suitable amount. In some examples, abradable coating 14 may include between about 5 percent by weight (wt. %) and about 20 wt. % of the dislocator phase. In other examples, abradable coating 14 may include more or less of the dislocator phase to increase or decrease the fracture strength of abradable coating 14 as desired. For example, increasing an amount of the dislocator phase may reduce the fracture strength of abradable coating 14, while reducing an amount of the dislocator phase may increase the fracture strength of abradable coating 14. Examples of dislocator phases may include, but are not limited to, hafnium diboride ($HfB_2$), zirconium diboride ($ZrB_2$), tantalum carbide ($Ta_2C$), titanium diboride ($TiB_2$), Zirconium carbide (ZrC), hafnium carbide (HfC), tantalum diboride ($TaB_2$), hafnium nitride (HfN), tantalum nitride (TaN or $Ta_2N$), niobium carbide (NbC), or combinations thereof. The dislocator phase may be distributed substantially throughout the volume of abradable coating 14.

In some examples, abradable coating 14 may also include one or more additives configured to enhance the resistance of abradable coating 14 to environmental or chemical degradation (e.g., CMAS deposits). Such additives may include for example bi-valance, tri-valance, or tetra-valence metal oxides including, but not limited to, calcium oxide (CaO), barium oxide (BaO), magnesium oxide (MgO), titanium dioxide ($TiO_2$), alumina ($Al_2O_3$), silicon dioxide ($SiO_2$), tantalum pentoxide ($Ta_2O_5$), hafnium silicate ($HfSiO_4$), alkali oxides, alkali earth oxides, or combinations thereof. In some examples, the inclusion of such additives into outer abradable coating 14 may significantly reduce or inhibit the ingress of CMAS deposits and/or the deleterious side reactions associated with the diffusion of CMAS deposits into the outer layers of article 10. For example, the presence of the one or more additives in abradable coating 14 may disrupt some of the reaction mechanisms associated with CMAS deposits by disturbing the chemical equilibrium of one or more of the CMAS reaction(s). For example, the presence of calcia (calcium oxide) within abradable coating 14 may lower one or more of the reaction rates associated with CMAS degradation, thereby creating a reaction gradient within abradable coating 14 and slowing the reactions between abradable coating 14 and one or more of the deleterious compounds and/or reactive intermediates associated with CMAS deposits. Presence of the one or more additives in abradable coating 14 may additionally or alternatively reduce a diffusion gradient of one or more components of CMAS into abradable coating 14.

In some examples, the one or more additives may be added with the rare earth silicate phase in abradable coating 14 in amount between greater than 0 mol. % and less than about 14 mol. % of abradable coating 14. In some examples, the one or more additives may be added with the rare earth silicate phase in abradable coating 14 in an amount between greater than 0 mol. % and less than about 7 mol. % of abradable coating 14.

In some examples, abradable coating 14 may be characterized as a relatively dense abradable coating having an overall porosity of less than about 30 vol. %, less than about 20 vol. %, or between about 1 vol. % and about 10 vol. % (e.g., the percent volume of abradable coating 14 occupied by gas or voided space). In some examples, substantially closed pores within abradable coating 14 may be desired, e.g., pores that do not extend throughout a thickness of abradable coating 14. Closed porosity may reduce a migration rate of environmental species (e.g., CMAS) through abradable coating 14.

The porosity of abradable coating 14 may be controlled with the processing technique used to create the abradable coating 14 and/or using fungible coating material additives. For example, to create intentional porosity in abradable coating 14, a fungible coating material additive that melts or burns at the use or deposition temperatures of the article 10 or a heat treatment step to which abradable coating 14 is exposed prior to use may be incorporated into the coating material that forms abradable coating 14. The coating material additive may include, for example, graphite, hexagonal boron nitride, or a polymer such as a polyester, and may be incorporated into the coating material prior to deposition of abradable coating 14. The fungible coating material additive then may be melted or burned off in a post-deposition heat treatment, or during operation of the gas turbine engine, to form pores within abradable coating 14. The post-deposition heat-treatment may be performed at up to about 1150° C. for a component having a substrate 12 including a superalloy, or at up to about 1500° C. for a component having a substrate 12 including a CMC or other ceramic material. In some examples, the level of porosity within abradable coating 14 may be adjusted as needed to either increase or decrease the bonding strength and the associated abrasion properties within abradable coating 14.

Abradable coating 14 may be deposited on at least one of substrate 12 or intermediate layers 16 using any suitable technique. Suitable deposition techniques may include, for example, thermal/plasma spraying, suspension thermal/plasma spray, physical vapor deposition (PVD) such as electron beam physical vapor deposition (EB-PVD) or directed vapor deposition (DVD), chemical vapor deposition (CVD), cathodic arc deposition, slurry dipping, sol-gel coating, electrophoretic deposition, and the like. For example, abradable coating 14 may be formed by mixing together particles of the rare earth silicate and particles of the dislocator phase and deposited the particles using thermal/plasma spraying or suspension thermal/plasma spray. The particles may be pre-mixed or mixed as a consequence of the deposition process.

In some examples, abradable coating 14 may be deposited to a thickness of up to approximately 0.1 inches (about 2.5 mm). In other examples, abradable coating 14 may be deposited to a thickness of approximately 0.030 to approximately 0.005 inches (approximately 0.76 mm to approximately 1.27 mm). In some examples, abradable coating 14 may be deposited to a thickness approximately equal to or greater than the desired final thickness and may be machined to the desired final thickness.

Article 10 may also include one or more optional intermediate layers 16 deposited on substrate 12 and positioned between abradable coating 14 and substrate 12. In some examples, the one or more optional intermediate layers 16 may include one or more of a bond coat, a diffusion barrier layer, a passively formed layer (e.g., scale layer), an EBC, or a TBC in any suitable arrangement. In some examples, the intermediate layers 16 may be single layer systems or multiple layer systems that work together to serve one or more specific functions. It will be appreciated that while the additional layers may be included in the design and construction of article 10, the improved design of abradable coating 14 may permit the omission of one or more different types of layers, reduce the total number of various intermediate coating layers included in the design of article 10, or reduce the thickness of one or more of the intermediate coating layers and still provide sufficient thermal or environmental protection to substrate 12. Additionally, or alternatively, while abradable coating 14 is described and depicted as the outermost layer of article 10, in other examples, an additional top-layer may be applied on abradable coating 14.

Figure 2:
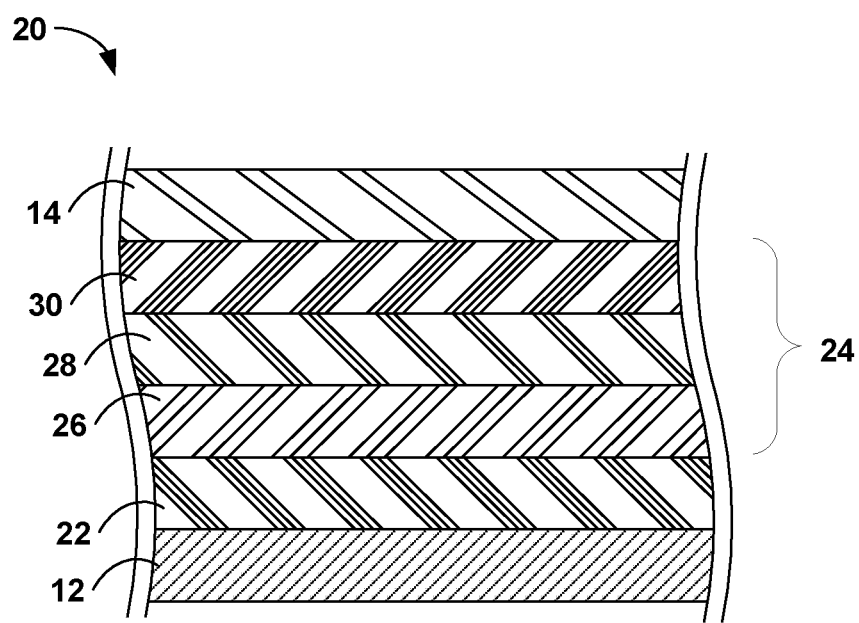
FIG. 2 is a cross-sectional diagram illustrating an example article that includes an abradable coating deposited on a plurality of intermediate layer, which is deposited on a substrate.

FIG. 2 illustrates a cross-sectional view of an example article 20 including substrate 12, abradable coating 14, and a plurality of intermediate layers between substrate 12 and abradable coating 14. The intermediate layers may include, for example, a bond coat 22 deposited on substrate 12 and a multilayer EBC/TBC 24 deposited on bond coat 22.

Bond coat 22 may be deposited on or deposited directly on substrate 12. Bond coat 22 may improve adhesion between an overlying layer (e.g., multilayer EBC/TBC 24) and substrate 12. In examples in which substrate 12 includes a superalloy, bond coat 22 may include an alloy, such as a MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-$Ni_3Al$ nickel aluminide alloy (either unmodified or modified by Pt, Cr, Hf, Zr, Y, Si, and combinations thereof), or the like.

In other examples where substrate 12 includes a ceramic or CMC, bond coat 22 may include a ceramic or other material that is compatible with substrate 12. For example, bond coat 22 may include mullite (aluminum silicate, $Al_6Si_2O_{13}$), silica, silicides, silicon, silicon alloy, or the like.

Bond coat 22 may further include other ceramics, such as rare earth silicates including silicates of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium) La (lanthanum), Y (yttrium), and Sc (scandium).

In some examples, the compositions of a bond coat 22 for depositing over a silicon based ceramic or CMC substrate 12 may include silicon metal (e.g., elemental silicon) or a silicon alloy. The presence of silicon in bond coat 108 may promote adherence between bond coat 22 and substrate 12 when substrate 12 includes silicon or a compound containing silicon, such as silicon carbide. Suitable silicon alloy materials may include, for example, an iron-silicon alloy, an aluminum-silicon alloy, a magnesium-silicon alloy, a calcium-silicon alloy, a molybdenum-silicon alloy, a niobium-silicon alloy, a chromium-silicon alloy, a tantalum-silicon alloy, a titanium-silicon alloy, a tungsten-silicon alloy, a zirconium-silicon alloy, or the like. As used herein, a "silicon alloy" is used to refer to a mixture of silicon and at least one other metal that results in a single-phase material as opposed to silicon plus an additive, as described further below, that results in the formation of at least two different phases. In some examples, bond coat 22 may be relatively dense (e.g., have a relatively low overall porosity of less than about 3 vol. %). The relatively low porosity and high density of bond coat 22 may help improve the protective properties of the bond coat as well as longevity of the bond coat. For example, the decreased porosity may reduce migration of deleterious environmental species through bond coat 22. In some examples, a relatively dense bond coat 22 may be formed using suspension thermal spray, PVD, CVD, or the like; however, bond coat 22 may be applied using any suitable technique including, but not limited to, thermal/plasma spraying, cathodic arc deposition, slurry dipping, sol-gel coating, electrophoretic deposition, and the like.

Multilayer EBC/TBC 24 may include layers configured to protect substrate 12 and/or bond coat 22 from detrimental environmental species, insulate substrate 12 from the high-temperature external environments, or the like. For example, EBC/TBC 24 may include one or more layers configured as a TBC layer that includes thermally insulative materials that may allow for article 20 to remain stable at temperatures greater than the maximum working temperature for the underling substrate material. A TBC layer may be useful when substrate 12 includes a superalloy material, which may typically have a lower operational temperature compared to ceramic or CMC substrate materials. The TBC layer may be a porous layer or a columnar layer, and may be formed using, for example, suspension thermal spraying, including suspension plasma spraying or suspension HVOF spraying; CVD; PVD, including EB-PVD and DVD; plasma or thermal spraying processes, cathodic arc deposition, slurry dipping, sol-gel coating, electrophoretic deposition, or the like. In this way, the TBC layer may allow use of article 20 within high-temperature environments without causing substrate 12 to reach its maximum temperature threshold.

Example TBC materials may include ceramic layers comprising $ZrO_2$ or $HfO_2$. A TBC layer that includes $ZrO_2$ or $HfO_2$ optionally may include one or more other elements or compounds to modify a desired characteristic of the TBC layer, such as, for example, phase stability, thermal conductivity, or the like. Example additive elements or compounds may include one or more include rare earth oxides (oxides of Lu, Yb, Tm, Er, Ho, Dy, Tb, Gd, Eu, Sm, Pm, Nd, Pr, Ce, La, Y, or Sc). Particular examples of materials from which the TBC layer may be formed include $ZrO_2$ stabilized with about 7 weight percent (wt. %) to about 8 wt. % $Y_2O_3$; $ZrO_2$ stabilized with $Yb_2O_3$, $Sm_2O_3$, and at least one of $Lu_2O_3$, $Sc_2O_3$, $Ce_2O_3$, $Gd_2O_3$, $Nd_2O_3$, or $Eu_2O_3$; or $HfO_2$ stabilized with $Yb_2O_3$, $Sm_2O_3$, and at least one of $Lu_2O_3$, $Sc_2O_3$, $Ce_2O_3$, $Gd_2O_3$, $Nd_2O_3$, or $Eu_2O_3$. In some examples, the TBC layer may include $ZrO_2$ and/or $HfO_2$ in combination with additive elements or compounds such that at least some of the stabilized $ZrO_2$ and/or $HfO_2$ forms a metastable tetragonal-prime crystalline phase, a cubic crystalline phase, or a compound phase ($RE_2Zr_2O_7$ or $RE_2Hf_2O_7$). In some examples, the TBC layer may have a thickness between about 76.2 µm and 508 µm, or the TBC layer may have a thickness of about 127 µm to about 381 µm.

In some examples, such as where substrate 12 includes a ceramic or CMC, EBC/TBC 24 may include one or more EBC based layers. Ceramic or CMC based substrate materials may exhibit a higher operating temperature threshold compared to superalloy materials, however may be more prone to chemical degradation. As shown in FIG. 2, EBC/TBC 24 may include a base layer 26 including a rare earth disilicate. The rare earth disilicate may reduce the ingress of water vapor through base layer 26 as well as provide relatively good adherence to underlying bond coat 22. Additionally, or alternatively, base layer 26 may act as a transition layer between bond coat 22 and any outer layer (e.g., barrier coating 28) applied over base layer 26 that may otherwise react with bond coat 22.

In some examples, base layer 26 may include one or more dopants including, for example, alumina ($Al_2O_3$), an alkali oxide, an alkaline earth oxide, or combinations thereof. In some examples, the dopant (e.g., alumina) may help reduce the growth rate of silica scale at the interface between bond coat 22 and base layer 26. The dopant may be present in an amount between about 0.1 wt. % and about 5 wt. %, with the balance of the rare earth disilicate layer being the disilicate. In some examples, the dopant may be added as a distinct phase region or may be dispersed within the crystalline structure of the material to which its being added. For example, in the examples of a rare earth silicate doped with an alumina dopant, molecules of alumina may be dispersed within the rare earth silicate phase region, occupy a separate phase region to that of the rare earth silicate, or both.

In some examples, base layer 26 may consist essentially of ytterbium disilicate ($Yb_2Si_2O_7$) and one or more dopant such as alumina (e.g., consist of ytterbium disilicate and an alumina dopant and any other contaminates/compounds that do not materially affect the basic and characteristics of the doped ytterbium disilicate base layer 26). In some examples, base layer 26 may have a thickness of about 76.2 µm to about 381 µm.

EBC/TBC 24 also includes a barrier coating 28 deposited on base layer 26. Barrier coating 28 may be used to prevent or reduce the transmission of deleterious compounds or gases (e.g., water vapor or reactive gases) through EBC/TBC 24. In some examples, barrier coating 28 may act as a sealing layer providing a relatively hermetic seal over substrate 12.

In some examples, barrier coating 28 may be formed as a single layer. For example, barrier coating 28 may include a rare earth silicate (e.g., rare earth monosilicate, rare earth disilicate, or combination thereof) doped with titanium disilicide ($TiSi_2$) or molybdenum disilicide ($MoSi_2$). In some examples, $TiSi_2$ or $MoSi_2$ to a rare earth silicate (e.g., ytterbium silicate) may enable the layer to be self-sealing to significantly reduce the presence of cracks, fractures, or pores within the layer. For example, the presence of through-thickness cracks that form in traditional EBCs via the deposition techniques or during the service life of the component may provide pathways for the ingress of deleterious gaseous species like oxygen and water vapor. As a consequence, the oxidation rate of the silicon interface and water vapor attack on one or more of the underlying layers (e.g., bond coat 22) or substrate 12 may be accelerated leading to early degradation or fatigue of component 20. Adding $TiSi_2$ or $MoSi_2$ to a rare earth silicate during the production of the layer may significantly reduce the presence of such through thickness cracks as well as reduce the chance of such cracks forming during use or operation of article 10. The sealing properties of the layer may provide a strong barrier against the ingress of deleterious gases such as oxygen or other harmful compounds such as water vapor. In some examples, the $TiSi_2$ or $MoSi_2$ may be added to the rare earth silicate in an amount of about 1 wt. % to about 10 wt. % and deposited on base layer 26 to define a thickness between about 1 micrometer to about 20 micrometers. In some examples, the $TiSi_2$ or $MoSi_2$ doped rare earth silicate layer may have a thickness of about 76.2 µm to about 381 µm.

In other examples, barrier coating 28 may itself be a multi-layer system. For example, barrier coating 28 may include a first layer including barium-strontium-aluminosilicate ($BaO_x$—$SrO_{1-x}$—$Al_2O_3$-$2SiO_2$; BSAS) deposited on base layer 26, and a second layer including a rare earth silicate (e.g., rare earth monosilicate, rare earth disilicate, or combination thereof) deposited on the first layer of BSAS. In such examples, the first layer of BSAS may form a relatively dense and amorphous layer that provides hermetic sealing properties and protection against water vapor and gas transmission. In some examples, the BSAS layer may have a thickness of about 76.2 µm to about 381 µm. The second layer of the barrier coating 28 with the rare earth silicate may help to thermally insulate the first layer of BSAS and underlying substrate 12 from the high-temperature environments in which component 20 is operated. Additionally, or alternatively, the second layer including a rare earth silicate may improve the robustness of the barrier coating 28 to provide a longer thermal cycling life for component 20. In some examples, the rare earth silicate may include or consist essentially of ytterbium silicate. The second layer including the rare earth silicate may also include one or more dopants including, for example, alumina ($Al_2O_3$), alkali oxide, alkaline earth oxide, or combinations thereof. The dopants in the second layer may facilitate stronger bonding between the second layer and the directly adjacent layers. In some examples, the second layer may have a thickness of about 76.2 µm to about 381 µm.

In some examples, article 20 may also include an optional CMAS-resistant layer 30 deposited between EBC/TBC 24 and abradable coating 14. CMAS-resistant layer 30 may include an element or compound that reacts with CMAS to form a solid or a highly-viscous reaction product (e.g., a reaction product that is a solid or highly viscous at the temperatures experienced by article 20). The reaction product may have a melting temperature significantly higher than CMAS (e.g., higher than about 1200-1250° C.), which may form a reaction layer that lowers the reaction rate of the CMAS with the CMAS-resistant layer. That is, once a solid or highly viscous reaction layer forms on or within CMAS-resistant layer 30, the reaction between CMAS-resistant layer 30 and CMAS deposits will slow, because any further reaction will require the diffusion of additional CMAS deposits through the reaction layer to encounter CMAS-resistant layer 30, or diffusion of a component of CMAS-resistant layer 30 through the reaction layer to encounter the CMAS deposits. In either case, the diffusion of either CMAS deposits or a component of CMAS-resistant layer 30 is expected to be the limiting step in the reaction once a solid or highly viscous reaction layer is formed on the surface or within CMAS-resistant layer 30, because diffusion will be the slowest process.

In some examples, optional CMAS-resistant layer 30 may include one or more rare earth silicates combined with one or more additives. The rare earth silicates may include one or more rare earth monosilicates in accordance with the formula $ReSiO_5$, one or more rare earth disilicates in accordance with the formula $Re_2Si_2O_7$, or both. The additive to CMAS-resistant layer 30 may include, but are not limited to, calcium oxide (CaO), barium oxide (BaO), magnesium oxide (MgO), titanium dioxide ($TiO_2$), alumina ($Al_2O_3$), silicon dioxide ($SiO_2$), tantalum pentoxide ($Ta_2O_5$), hafnium silicate ($HfSiO_4$), alkali oxides, alkali earth oxides, or combinations thereof. In some such examples, the additives may be added to CMAS-resistant layer 30 in an amount between greater than 0 mol. % and less than about 14 mol. % of CMAS-resistant layer 30. In some examples, the one or more additives may be added with the rare earth silicate phase in CMAS-resistant layer 30 in an amount between greater than 0 mol. % and less than about 7 mol. % of CMAS-resistant layer 30.

In some examples, optional CMAS-resistant layer 30 may include or consist essentially of ytterbium silicate (e.g., $YbSiO_5$, $Yb_2SiO_7$, or both) and one or more of the above listed additives. Layers that include ytterbium silicate have been found to exhibit improved resistance to water vapor infiltration and degradation compared to other rare earth silicates (e.g., yttria silicate), but have likewise been found to be more susceptible to CMAS degradation compared to other coatings that include rare earth silicates. The combination of ytterbium silicate and one or more of the listed additives may provide both improved resistance to water vapor infiltration and degradation as well as CMAS-resistant compared to other coatings. In some examples, CMAS-resistant layer 30 may include ytterbium disilicate (e.g., $Yb_2SiO_7$) and a calcia dopant (e.g., deposited as coating of using only ytterbium disilicate and calcia). Ytterbium disilicate may provide a better oxygen barrier compared to ytterbium monosilicate, thereby reducing a rate at which a silica scale forms within article 20.

In some examples, CMAS-resistant layer 30 may have a dense microstructure defining a porosity of less than 20 vol. %, where porosity is measured as a percentage of pore volume divided by total volume of CMAS-resistant layer 30. The dense microstructure of CMAS-resistant layer 30 may be more effective in preventing the infiltration of CMAS deposits or other environmental contaminants than a columnar or porous microstructure. Additionally, or alternatively, CMAS-resistant layer 30 may include a columnar microstructure to improve the thermal insulation properties of the layer.

CMAS-resistant layer 30 may be formed using any suitable technique including, for example thermal/plasma spraying, suspension thermal/plasma spray, PVD such as EB-PVD or DVD, CVD, cathodic arc deposition, slurry dipping, sol-gel coating, electrophoretic deposition, and the like. In some examples, CMAS-resistant layer 30 may have a thickness of about 25.4 µm to about 2540 µm. In other examples, the CMAS-resistant layer may have a thickness of about 76.2 µm to about 635 µm.

Figure 3:
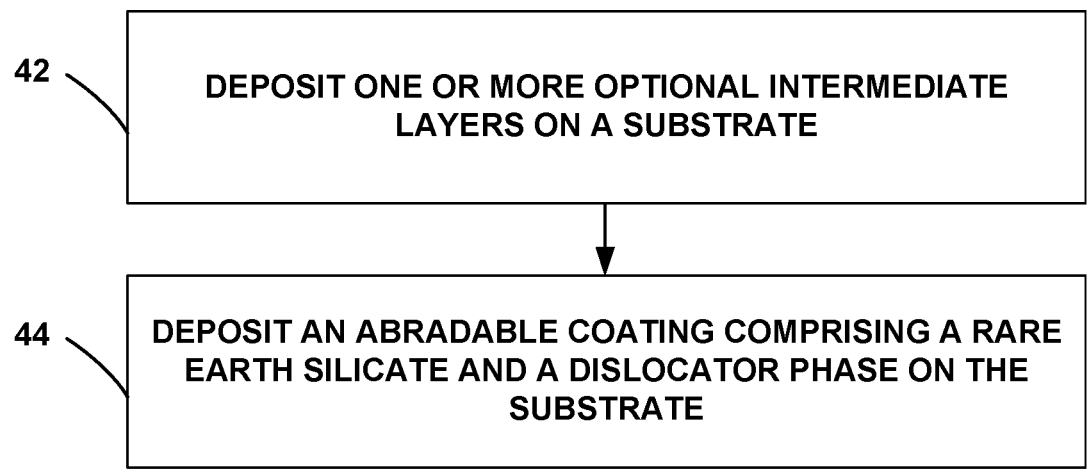
FIG. 3 is a flow diagram illustrating an example technique for forming an abradable coating as described herein on a substrate.

FIG. 3 is a flow diagram illustrating an example technique for forming articles 10 and 20 including substrate 12, one or more optional intermediate layers 16 on substrate 12, and abradable coating 14 on optional intermediate layers 16. The technique of FIG. 3 is described in reference to articles 10 and 20 of FIGS. 1 and 2, although the technique of FIG. 3 may be used to form different articles, and articles 10 and 20 may be formed using a different technique.

The technique of FIG. 3 includes forming one or more optional intermediate layers 16 on at least a portion of substrate 12 (42). In some examples, the one or more optional intermediate layers 16 may include, for example, bond coat 22 deposited on or directly on substrate 12 and EBC/TBC 24. As described above, bond coat 22 and EBC/TBC 24 may be single or multi-layer systems. The composition, configuration, and arrangement of the layers may be selected depending on the composition of substrate 12. For example, in some examples where substrate 12 includes a superalloy, bond coat 22 may include an alloy, such as a MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-Ni₃Al nickel aluminide alloy (either unmodified or modified by Pt, Cr, Hf, Zr, Y, Si, and combinations thereof), or the like; and EBC/TBC 24 may include a TBC composed of suitable thermally insulating materials such as ceramics comprising $ZrO_2$ or $HfO_2$ optionally stabilized with one or more additives including, for example, one or more rare earth oxides. In some examples where substrate 12 includes a ceramic or CMC (e.g., silicon carbide), bond coat 22 may include silicon or a silicon alloy, such as an iron-silicon alloy, an aluminum-silicon alloy, a magnesium-silicon alloy, a calcium-silicon alloy, a molybdenum-silicon alloy, a niobium-silicon alloy, a chromium-silicon alloy, a tantalum-silicon alloy, a titanium-silicon alloy, a tungsten-silicon alloy, a zirconium-silicon alloy, or the like; and EBC/TBC 24 may include a single or multilayer EBC. In some examples, the EBC may include, for example, base layer 26 including a rare earth disilicate and acts, in part, as transition layer between bond coat 22 and any outer layer and a barrier coating 28 deposited on base layer 26 and configured to help seal or inhibit the transition of deleterious compounds such as water vapor or harmful gases across barrier coating 28. In some examples, the barrier layer 28 may include one or more rare earth silicates doped with $TiSi_2$ or $MoSi_2$ to produce a self-sealing layer. In other examples, barrier coating 28 may include a first layer of BSAS and a second layer deposited on the first layer that includes a rare earth silicate and one or more optional dopants (e.g., alumina ($Al_2O_3$), alkali oxide, alkaline earth oxide, or combinations thereof). In some examples, EBC/TBC 24 may also include optional CMAS-resistant layer 30 to act as a barrier to inhibit or reduce the degradation associated with CMAS deposits. In some examples, CMAS-resistant layer 30 may include one or more rare earth silicates combined with one or more additives (e.g., calcium oxide (CaO), barium oxide (BaO), alumina ($Al_2O_3$), titanium dioxide ($TiO_2$), silica ($SiO_2$), or combinations thereof).

The one or more intermediate layers 16 may be deposited on substrate 12 using any suitable technique, including for example, thermal/plasma spraying, suspension thermal/plasma spray, PVD such as EB-PVD or DVD, CVD, cathodic arc deposition, slurry dipping, sol-gel coating, electrophoretic deposition, and the like.

The technique of FIG. 3 also includes depositing abradable coating 14 on substrate 12 (44). In some examples, abradable coating 14 may be deposited directly on substrate 12, while in other examples one or more of the optional intermediate layers 16 described above may separate substrate 12 and abradable coating 14. The dislocate phase may include, for example, hafnium diboride ($HfB_2$), zirconium diboride ($ZrB_2$), tantalum nitride (TaN or $Ta_2N$), tantalum carbide ($Ta_2C$), or combinations thereof, and may be added as a plurality of distinct phase regions (e.g., a phase region distinguishable from the rare earth silicate) within abradable coating 14. In some examples, the dislocator phase may be included in an amount of about 5 wt. % to about 20 wt. % relative to the amount of rare earth silicate within abradable coating 14.

In some examples, abradable coating 14 may also include one or more additives such as bi-valance, tri-valance, or tetra-valence metal oxides including, but are not limited to, calcium oxide (CaO), barium oxide (BaO), magnesium oxide (MgO), titanium dioxide ($TiO_2$), alumina ($Al_2O_3$), silicon dioxide ($SiO_2$), tantalum pentoxide ($Ta_2O_5$), hafnium silicate ($HfSiO_4$), alkali oxides, alkali earth oxides, or combinations thereof. The additives may be introduced added with the rare earth silicate to modify one or more of the characteristics of abradable coating 14 such as to enhance the barrier properties of the layer or its ability to resist degradation associated with CMAS deposits.

As described above, the inclusion of the dislocator phase in abradable coating 14 may permit the layer to be deposited in a more densified form (e.g., lower porosity) while still permitting the coating to exhibit a desired level of abradability. In some example, abradable coating 14 may define porosity of less than about 30 vol. %, less than about 20 vol. %, or between about 1 vol. % and about 10 vol. %. In some examples, where desired, materials used to form abradable coating 14 may be deposited with the inclusion of a fungible coating material additive such as graphite, hexagonal boron nitride, or a polymer to increase the final porosity of abradable coating 14.

Abradable coating 14 may be deposited on substrate 12 using any suitable technique including, for example, thermal spraying, suspension thermal spraying, physical vapor deposition (e.g., EB-PVD or DVD), chemical vapor deposition, cathodic arc deposition, slurry dipping, sol-gel coating, electrophoretic deposition, and the like. For example, abradable coating 14 may be formed by mixing together particles of the rare earth silicate and particles of the dislocator phase and depositing the particles using thermal/plasma spraying or suspension thermal/plasma spray. The particles may be pre-mixed or mixed as a consequence of the deposition process. In examples where the abradable coating is deposited with one or more of the above-mentioned additives and/or fungible coating material additives, the materials may be added in particle form to the mixture of rare earth silicate and dislocator phase particles. Additionally, or alternatively, the above-mentioned additives may be added with the rare earth silicate and the resultant mixture may be subsequently converted into particulate form.

Various examples of the invention have been described. These and other examples are within the scope of the following claims.

The invention claimed is:

1. An article for use in a high-temperature environment comprising:
    a substrate comprising a superalloy material, a ceramic, or a ceramic matrix composite; and
    an abradable coating on the substrate, the abradable coating comprising a rare earth silicate and a dislocator phase, wherein the dislocator phase forms one or more distinct phase regions in the abradable coating and comprises at least one of hafnium diboride (HfB$_2$), zirconium diboride (ZrB$_2$), tantalum nitride (TaN or Ta$_2$N), tantalum carbide (Ta$_2$C), titanium diboride (TiB$_2$), zirconium carbide (ZrC), hafnium carbide (HfC), tantalum diboride (TaB$_2$), hafnium nitride (HfN), or niobium carbide (NbC), and wherein the abradable coating comprises between about 5 percent by weight (wt. %) and about 20 wt. % of the dislocator phase.

2. The article of claim 1, wherein the dislocator phase reduces the internal mechanical strength of the abradable coating.

3. The article of claim 2, wherein the abradable coating further comprises at least one additive selected from the group consisting of calcium oxide (CaO), barium oxide (BaO), magnesium oxide (MgO), titanium dioxide (TiO$_2$), alumina (Al$_2$O$_3$), silicon dioxide (SiO$_2$), tantalum pentoxide (Ta$_2$O$_5$), hafnium silicate (HfSiO$_4$), an alkali oxide, and an alkali earth oxide.

4. The article of claim 1, wherein the dislocator phase has a lower coefficient of friction than the rare earth silicate.

5. The article of claim 1, wherein the abradable coating defines a porosity of less than 20 percent by volume (vol. %).

6. The article of claim 1, wherein the rare earth silicate comprises at least one of ytterbium monosilicate or ytterbium disilicate.

7. The article of claim 1, further comprising:
a bond coat on the substrate; and
an environmental barrier coating (EBC) or a thermal barrier coating (TBC) between the bond coat and the abradable coating.

8. The article of claim 7, wherein the article comprises the EBC, wherein the EBC comprises:
a base layer on the bond coat, the base layer comprising a first rare earth silicate; and
a barrier coating on the base layer, the barrier coating comprising a first layer and a second layer on the first layer, the first layer comprising barium-strontium-aluminosilicate, the second layer comprising a second rare earth silicate.

9. The article of claim 8, wherein the second layer further comprises at least one dopant selected from the group consisting of alumina, an alkali oxide, an alkaline earth oxide, and combinations thereof.

10. The article of claim 7, wherein the article comprises the EBC, wherein the EBC comprises:
a base layer on the bond coat, the base layer comprising a first rare earth silicate; and
a barrier coating on the bond coat, the barrier coating comprising a second rare earth silicate and at least one of TiSi$_2$ or MoSi$_2$.

11. The article of claim 7, wherein the EBC or the TBC comprises a calcium-magnesium-alumino-silicate (CMAS) resistant layer, wherein the CMAS-resistant layer comprises a rare earth silicate and at least one additive selected from the group consisting of calcium oxide (CaO), barium oxide (BaO), magnesium oxide (MgO), titanium dioxide (TiO$_2$), alumina (Al$_2$O$_3$), silicon dioxide (SiO$_2$), tantalum pentoxide (Ta$_2$O$_5$), hafnium silicate (HfSiO$_4$), an alkali oxide, an alkali earth oxide, and combinations thereof.

12. A method comprising:
depositing a bond coat on a substrate, wherein the substrate comprises a superalloy material, a ceramic, or a ceramic matrix composite;
depositing an environmental barrier coating (EBC) or a thermal barrier coating (TBC) on the bond coat;
depositing an abradable coating on the EBC or the TBC wherein the abradable coating comprises a rare earth silicate and a dislocator phase, wherein the dislocator phase forms one or more distinct phase regions in the abradable coating and comprises at least one of hafnium diboride (HfB$_2$), zirconium diboride (ZrB$_2$), tantalum nitride (TaN or Ta$_2$N), tantalum carbide (Ta$_2$C), titanium diboride (TiB$_2$), zirconium carbide (ZrC), hafnium carbide (HfC), tantalum diboride (TaB$_2$), hafnium nitride (HfN), or niobium carbide (NbC) wherein depositing the EBC or the TBC comprises:
depositing a base layer on the bond coat, the base layer comprising a first rare earth silicate; and
depositing a barrier coating on the base layer, wherein depositing the barrier coating on the base layer comprises at least one of:
depositing a first layer comprising barium-strontium-aluminosilicate and a second layer comprising a second rare earth silicate, or
depositing a layer comprising a second rare earth silicate and at least one of TiSi$_2$ or MoSi$_2$.

13. The method of claim 12, wherein the dislocator phase reduces the internal mechanical strength of the abradable coating.

14. The method of claim 13, wherein the abradable coating further comprises at least one additive selected from the group consisting of calcium oxide (CaO), barium oxide (BaO), magnesium oxide (MgO), titanium dioxide (TiO$_2$), alumina (Al$_2$O$_3$), silicon dioxide (SiO$_2$), tantalum pentoxide (Ta$_2$O$_5$), hafnium silicate (HfSiO$_4$), an alkali oxide, and an alkali earth oxide.

15. The method of claim 12, wherein depositing the abradable coating on the EBC or the TBC comprises depositing a mixture of particles using suspension thermal spraying or thermal spraying, wherein the mixture of particles comprises a first plurality of particles comprising the rare earth silicate, and a second plurality of particles comprising the dislocator phase.

16. The method of claim 15, wherein the mixture of particles further comprises the rare earth silicate and the at least one additive.

17. The method of claim 12, wherein the abradable coating defines a porosity of less than 20 percent by volume (vol. %).

18. An article for use in a high-temperature environment, the article comprising:
a substrate comprising a superalloy material, a ceramic, or a ceramic matrix composite; and
an abradable coating on the substrate, the abradable coating comprising a rare earth silicate and a dislocator phase, wherein the dislocator phase forms one or more distinct phase regions in the abradable coating and comprises at least one of hafnium diboride (HfB$_2$), zirconium diboride (ZrB$_2$), tantalum nitride (TaN or Ta$_2$N), tantalum carbide (Ta$_2$C), titanium diboride (TiB$_2$), zirconium carbide (ZrC), hafnium carbide (HfC), tantalum diboride (TaB$_2$), hafnium nitride (HfN), or niobium carbide (NbC), and wherein the abradable coating defines a porosity of less than 20 percent by volume (vol. %).

19. The article of claim 18, wherein the abradable coating further comprises at least one additive selected from the group consisting of calcium oxide (CaO), barium oxide (BaO), magnesium oxide (MgO), titanium dioxide (TiO$_2$), alumina (Al$_2$O$_3$), silicon dioxide (SiO$_2$), tantalum pentoxide (Ta$_2$O$_5$), hafnium silicate (HfSiO$_4$), an alkali oxide, and an alkali earth oxide.

20. The article of claim 1, wherein the rare earth silicate comprises at least one of ytterbium monosilicate or ytterbium disilicate.

* * * * *